July 29, 1969

H. L. GILL ET AL 3,457,778

SOIL TESTING APPARATUS

Filed June 30, 1966

INVENTORS.
HENRY L. GILL
LYMAN W. HELLER

BY

ATTORNEY

United States Patent Office 3,457,778
Patented July 29, 1969

3,457,778
SOIL TESTING APPARATUS
Henry L. Gill, Urbana, Ill., and Lyman W. Heller, Vicksburg, Miss., assignors to the United States of America as represented by the Secretary of the Navy
Filed June 30, 1966, Ser. No. 562,952
Int. Cl. G01n 3/00; E21b 47/00
U.S. Cl. 73—84                                8 Claims

ABSTRACT OF THE DISCLOSURE

Soil testing is needed to determine lateral soil strength characteristics which, in turn, determine the capability of the soil to laterally support underground structures such as poles, bulkheads, etc. A pair of concentric inner and outer tubes are driven simultaneously into the soil by applying force solely to the inner tube which, in turn, directly engages the outer tube. Once driven, the inner tube can be removed with its core of soil and a lateral strength test instrument positioned in the emptied outer tube. Lateral testing is achieved by forming the outer tube with a laterally displaceable segment which the test instrument forcibly moves into the soil. The force required to be applied by the instrument determines the soil characteristics.

---

The invention described herein may be manufactured and used by or for the Government of the United States of America for governmental purposes without the payment of any royalties thereon or therefor.

The present invention relates to a soil testing apparatus and more particularly to a soil testing apparatus for determining the lateral strength of soil at a predetermined underground location.

A continuing need exists for more detailed and precise information to aid in the design of structures which depend upon horizontal support from soil. Examples of such structures are laterally loaded piles, utility poles, anchored bulkheads, piers, buried conduits and some types of buried protective shelters. Present design methods often result in overconservative, uneconomical structures. In the case of pile-supported structures, the designer is frequently forced, by a lack of knowledge of the horizontal loading-support capability of a soil deposit under consideration, to resort to costly "batter piles" for development of the necessary soil resistance when actually batter piles may not have been needed.

Initially, laboratory tests were performed on soil samples removed from the vicinity of a proposed structure in an effort to get more soil information. Such samples were usually taken with a coring device, the cost of the coring operation preventing the taking of very many samples in any one area and due to handling, lapse of time and change of environment, the samples were not truly representative of the actual conditions existing at the proposed site.

Later, devices were developed to test the soil at the site of construction. Devices such as that shown in Reese, Patent No. 2,824,445, greatly improved the accuracy of testing by having the testing instruments moved to the soil location rather than have a soil sample moved to the testing instruments. However, even with such devices, true readings were difficult to achieve since in the operation to drive the testing instruments into the ground the sensitive testing units were often damaged. Also the driving of a pile containing the instruments caused the displaced soil to compact adjacent the instrument thereby giving indications of stronger lateral strength than actually existed.

The present invention substantially eliminates the problem of compacting the soil and totally eliminates the problem of damaging the sensitive instruments during the driving operation by having in one embodiment of the invention two concentric juxtaposed tubes driven into the ground at the desired location, removing the inner tube which is filled with most, if not all, of the cut soil and then lowering the loading mechanism into the outer tube so as to test the soil. The loading mechanism can be placed to test in any direction with a scope of 360°. In addition, the present invention has so arranged the sensing devices as to achieve more accurate indications of the soil characteristics.

An object of the present invention is to provide a simply constructed, dependable and accurate soil testing apparatus to determine underground lateral soil strength characteristics.

Another object is to provide a soil testing apparatus which will minimize compaction of the soil when the apparatus is driven to its underground position.

A further object is to provide a soil testing apparatus which will not be damaged when it is forcibly driven into the ground under a driving force.

A still further object is to provide a testing apparatus which is highly sensitive and more reliable than heretofore achieved.

Other objects, advantages and novel features of the invention will become apparent from the following detailed description of the invention when considered in conjunction with the accompanying drawings wherein.

DESCRIPTION

Figure 1:
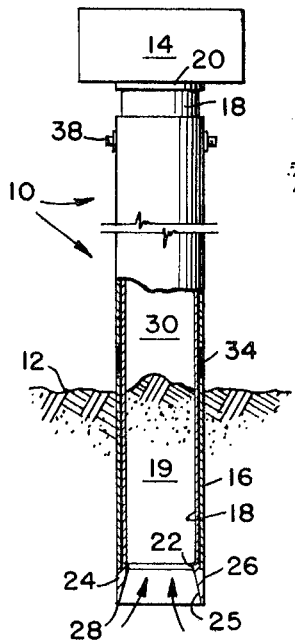
FIG. 1 is a partially cut away side view of the apparatus being driven into the ground.

Referring now to the drawings, wherein like reference numerals designate like or corresponding parts throughout the several views, there is shown in FIG. 1 the soil testing apparatus 10 being driven below the ground level 12 by a pile hammer 14. Upon reaching the desired depth, the apparatus can test the lateral strength of the soil so as to determine what the soil can support. The apparatus 10 comprising outer tube 16 and inner tube 18 is forced into the ground by having the pile hammer 14 contact a driving head 20 with sharp repeated blows. The driving head may be threadedly connected to the inner tube 18 so that the force from the pile hammer contacting the driving head is transmitted to the inner tube. The inner tube in turn transmits the force to a shoulder 22 of cutting shoe 24 which is rigidly attached to the lower end of the outer tube 16.

The cutting shoe inner surface 25 is tapered toward the inside of the inner tube 18 while retaining an outer surface 26 substantially flush with the outer surface of the outer tube. The tapered inner surface provides a sharp cutting edge 28 at the cutting shoe's lower end which directs the cut soil 19 into the cavity 30 of the inner tube 18. By cleanly slicing the soil during the driving operation and directing the severed soil 19 into the cavity of the inner tube, there is little or no compacting of the soil adjacent the outer surface of the outer tube 16; minimizing compaction results in more accurate data when the lateral strength of the soil is tested.

Figure 2:
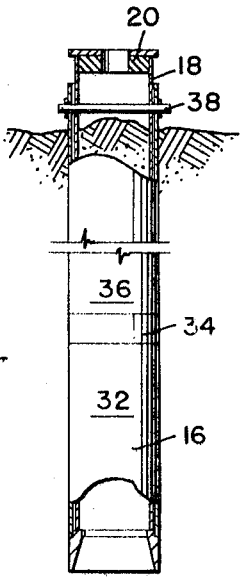
FIG. 2 is a partially cut away side view showing the apparatus in the ground after driving is complete.

The outer tube 16 is comprised of three sections, a lower section 32, FIG. 2, rigidly connected to the cutting shoe 24, a laterally displaceable segment 34 forming the middle section and an upper section 36 connected to the inner tube 18 by any suitable means such as a pin 38. The pin 38 spaces the upper section a slight distance from the segment 34 so that the segment is free to be laterally displaced into the surrounding soil. An additional spacer, such as Teflon, may be placed between the upper section 36 and the segment 34 to assure segment freedom. The inner tube 18 which has served as a force transmitter and a soil depository also acts to align the outer tube sections and segment during the driving operation.

Figure 3:
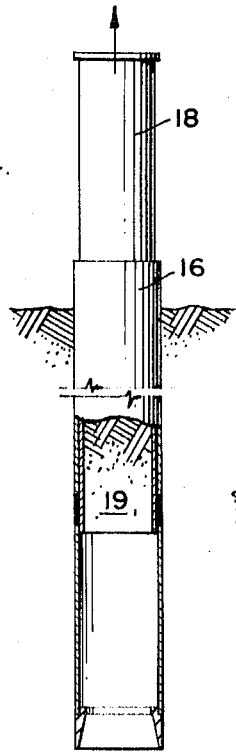
FIG. 3 is a partially cut away side view showing the inner tube being removed.

After the driving operation is completed, the inner tube is removed, FIG. 3, with the displaced soil 19 filling its cavity 30. If the soil should be too loose to remain within inner tube 18 without help, any of the prior art bottom closure devices such as that illustrated in U.S. Patent No. 1,761,292 or No. 3,039,309 may be employed to facilitate retention of the soil.

Figure 4:
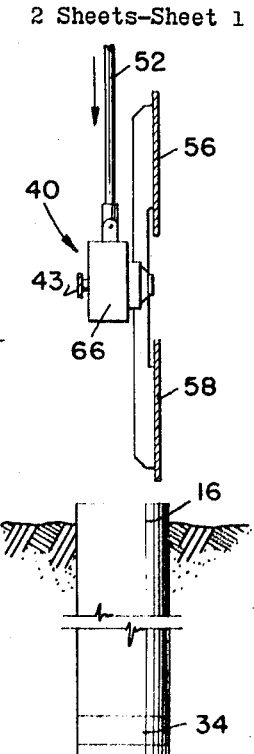
FIG. 4 is a side view showing the loading mechanism being lowered into the outer tube.

After removal of the inner tube the loading mechanism 40, FIG. 4, is lowered into the outer tube 16. By not subjecting the loading mechanism to the jarring movement of the driving operation, the usually expected damage to the sensitive instruments does not occur. Thus, the construction of the loading mechanism may be simplified by not requiring the added expensive cushioning means that would normally be necessary.

Figures 5, 6, 7:
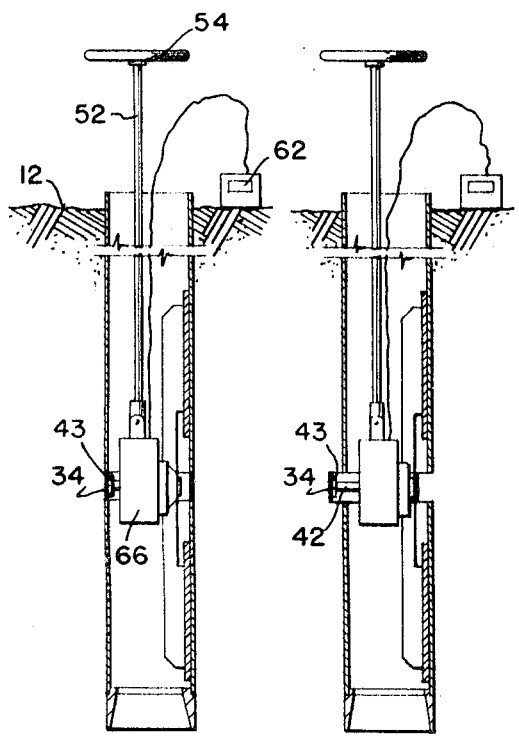
FIG. 5 is a sectional view showing the loading mechanism in position to start testing.
FIG. 6 is a sectional view showing the testing operation.
FIG. 7 is a partial sectional view showing the lowering of the retrieval means.
Figure 9:
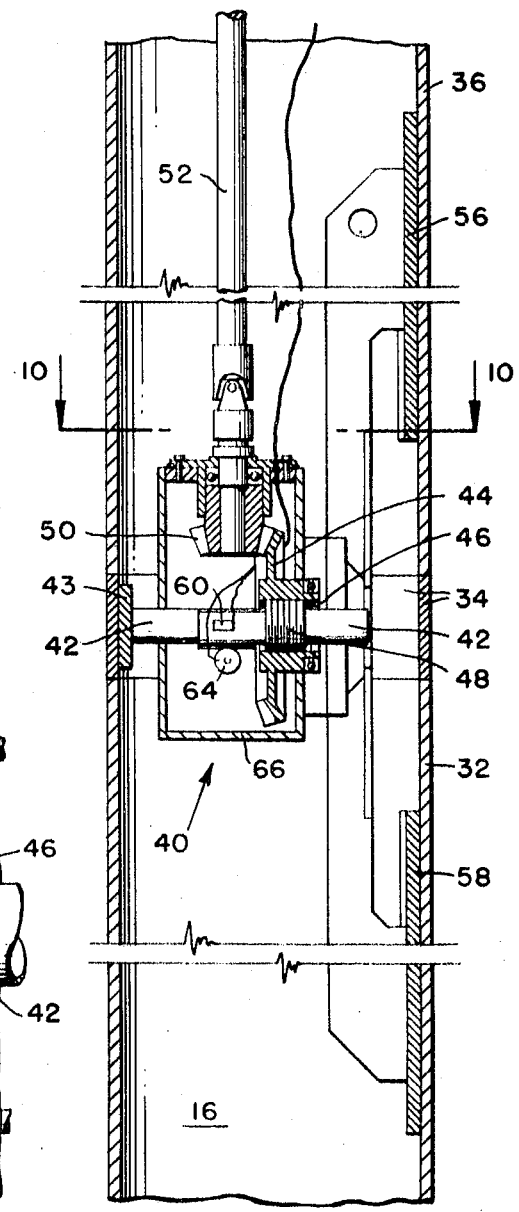
FIG. 9 is a partial sectional view detailing the loading mechanism.

The loading mechanism 40 comprises a loading shaft 42 and contact plate 43, FIG. 9, which are movable to bear against segment 34 to cause it to be laterally displaced into the soil as shown in FIG. 6. Movement of the loading shaft 42 is caused by gear 44 which has internal threads 46 corresponding to external threads 48 on the loading shaft. Rotation of the gear 44 causes linear movement of the loading shaft. The gear 44 is driven by pinion 50; both the gear and the pinion may be beveled. Pinion 50 is conected to a driven shaft 52 which extends upwardly through the outer tube 16 and is conected to wheel 54, FIG. 5, located above the ground level 12 so as to allow an operator to selectively turn the wheel to cause the desired lateral displacement of the segment 34.

Foot means 56 and 58, FIG. 9, may be positioned so as to bear against upper section 36 and lower section 32 respectively in reaction to the force of the loading shaft against segment 34 when the loading shaft and foot means are spread.

Figure 11:
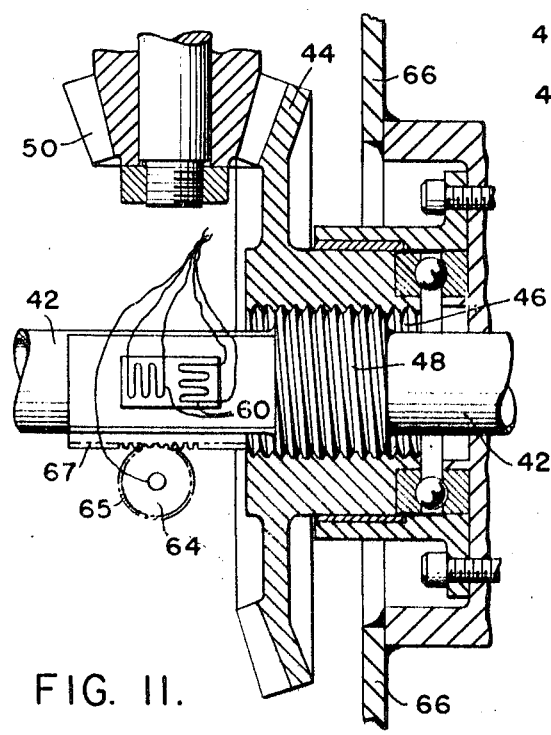
FIG. 11 is an enlarged sectional view of the loading mechanism.

Strain gage means 60, FIG. 11, may be attached to the loading shaft to sense the resistance of the soil to the displacement of the segment 34 and to indicate ambient temperature effects on the loading shaft so as to enable compensation for temperature deviations and interpretation of the test data recorded on a recorder-indicator 62, FIG. 5. Potentiometer means 64, FIG. 9, may be in contact with the loading shaft by means of little gear 65 and rack 67 mounted on the loading shaft so as to sense the distance traveled by the loading shaft and, hence, the displaced segment. Indication of distance travel may also be recorded on recorder-indicator 62.

The location of the strain gage means 60 directly on the loading shaft 42 allows more accurate determinations of the soil forces resisting displacement of segment 34. Prior disclosures placed such sensing devices at only one location, some point on the surface of a movable section, which placement might cause inaccurate indications since stress will not be evenly distributed over the surface of the movable section. The use of the potentiometer means 64 to sense distance is also an improvement since prior art disclosed the use of strain gages on a flexible strip of metal, which strip will deflect and cause strains to be indicated when displacement occurs. Elaborate testing must precede the use of such prior art devices to calibrate deflection and corresponding strain. The potentiometer means indicates the displacement directly and accurately.

The pinion 50, gear 44, loading shaft 42, and contact plate 43 may be enclosed and supported by container 66, FIG. 9, which may be waterproofed by being filled with a lightweight nonconductive oil so as to leave no room within the container for water.

Figure 8:
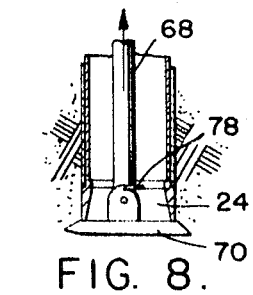
FIG. 8 is a partial sectional view showing removal of the testing apparatus.
Figure 10:
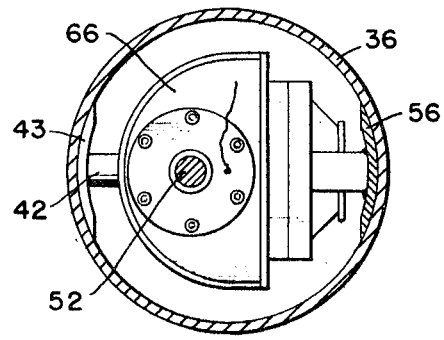
FIG. 10 is a top view taken along plane 10—10 of FIG. 9.

A retrieval means comprising a long rod 68, FIG. 7, with a beveled plate 70 hinged at a slightly off-center position at the lower end of the rod 72 is adapted to be lowered into the outer tube and driven below the cutting shoe 24, the plate being substantially parallel to the rod. The plate 70 is beveled at opposite ends 74 and 76 so that end 74 may cut the soil when it is driven lower than the cutting shoe as shown in FIG. 7. Beveled end 76 is adapted to dig into the soil when the rod is lifted; the off-center hinge 72 allows the plate, under the influence of the digging forces on end 76, to rotate from its folded, parallel position to a substantially perpendicular extended position relative to the rod so as to position the plate directly beneath cutting shoe 24, FIG. 8. Rotation beyond the extended position is prevented by a stop means such as flange 78 which is rigidly connected to the rod 68. The rod may then be raised to ground level 12 along with the testing apparatus.

OPERATION

In the operation of the testing apparatus the outer tube 16 and inner tube 18 are driven into the soil by pile hammer 14 until displaceable segment 34 is at a desired depth. During the driving operation cutting shoe 24 directs the cut soil into inner tube cavity 30 so as to prevent compaction of the soil around the outer surface of outer tube 16. The inner tube 18 is then removed along with the core of displaced soil 19 leaving a hollow outer tube 16. Loading mechanism 40 is lowered into the outer tube and positioned so that the loading shaft 42 is opposite the displaceable segment 34. The hand wheel 54 is turned until the loading mechanism is firmly supported by having the foot means 56 and 58 bear against upper section 36 and lower section 32 respectively and the loading shaft 42 with the contact plate 43 contact the segment 34.

Testing may begin by turning wheel 54 as desired to spread the loading shaft 42 and foot means 56 and 58 and noting the resisting force and displacement sensed by the strain gage means 60 and potentiometer means 64 respectively, as indicated by the recorder-indicator 62. When testing is finished at a selected location the loading mechanism is reversed within the outer tube so as to align the segment 34 with the upper section 36 and lower section 32. The apparatus 10 may now be removed and placed at a different location or it may be driven deeper so that a new test at a different depth may be commenced.

If it is decided to test at a different location the loading mechanism is removed and the inner tube 18 is reinserted so as to keep the outer tube sections and segment in alignment. The retrieval rod 68 and beveled plate 70 are lowered into the cavity 30 of the inner tube 18 and driven beneath the cutting shoe 24. The rod 68 is then lifted upward causing the beveled plate 70 to rotate and engage the lower end of the cutting shoe. Further lifting removes the test apparatus.

Obviously many modifications and variations of the present invention are possible in the light of the above teachings. It is therefore to be understood that within the scope of the appended claims the invention may be practiced otherwise than as specifically described.

We claim:
1. A soil testing apparatus for determining the lateral strength at an underground location comprising:

inner and outer concentric juxtaposed hollow tubes which are capable of being driven downwardly into the ground, the inner tube having its upper and disposed relative to said outer tube for directly receiving the driving force and said inner tube also being driveably engaged with said outer tube whereby said concentric tubes can be simultaneously driven into the ground by application of the driving force exclusively on said inner tube;

said inner tube being removable from the outer tube so that soil captured in the inner tube by the driving action can be removed to leave an open space within the outer tube;

said outer tube having a laterally displaceable segment located between top and bottom outer tube sections;

a loading mechanism, which is adapted to be inserted within the outer tube after removal of the inner tube, for selected lateral displacement of the segment into the soil surrounding said outer tube; and means connected to the loading mechanism for sensing segment displacement and soil resistance to said displacement, whereby the lateral strength of the soil at an underground location can be tested with a minimum of prior disturbance prior to said test.

2. A soil testing apparatus as claimed in claim 1 wherein said driveable engagement includes:

an annular cutting shoe connected to and extending downwardly from the driven end of the outer tube and having an outer wall substantially flush with the outer wall of said outer tube; and said cutting shoe having an inner wall which is tapered inwardly from a bottom cutting edge and which terminates at a top cutting shoe shoulder which is engageable with the bottom end of the inner tube, whereby the cutting shoe is capable of cutting through and directing soil into the inner tube.

3. A soil testing apparatus as claimed in claim 1 including:

means for connecting the top section of the outer tube to the inner tube so that the space between the outer tube sections is slightly greater than the height of said segment after the driving operation.

4. A soil testing apparatus as claimed in claim 1 wherein the loading mechanism comprises:

a loading shaft capable of bearing against the inner surface of said segment;

foot means adapted to bear against the inner wall of an outer tube section; and means for spreading the loading shaft and said foot means, whereby upon inserting the loading mechanism within the outer tube the loading shaft can be caused to laterally displace said segment.

5. A soil testing apparatus as claimed in claim 4 including:

strain gage means mounted on the loading shaft for sensing the soil resistance to displacement of the segment.

6. A soil testing apparatus as claimed in claim 4 including:

potentiometer means connected to the loading shaft for measuring the segment displacement.

7. A soil testing apparatus as claimed in claim 4 wherein the means for spreading the loading shaft and the foot means includes:

a pinion and a gear;

support means operatively connecting the pinion with said gear;

a driver shaft connected to the pinion; and said gear being threadedly mounted to corresponding threads on the loading shaft and adapted to cause lateral movement of the loading shaft upon rotation of the gear.

8. A soil testing apparatus as claimed in claim 7 wherein the support means comprises:

a container which encloses the loading shaft.

References Cited

UNITED STATES PATENTS

| 1,645,010 | 10/1927 | Kinley | 166—14 |
| 2,210,815 | 8/1940 | Linney | 166—46 |
| 2,824,445 | 2/1958 | Reese | 73—89 |
| 3,175,392 | 3/1965 | Tharalson et al. | 73—84 |

FOREIGN PATENTS

| 60,544 | 1/1943 | Denmark. |

RICHARD C. QUEISSER, Primary Examiner

C. E. SNEE III, Assistant Examiner

U.S. Cl. X.R.

73—151